(12) United States Patent
Takahashi et al.

(10) Patent No.: US 7,778,447 B2
(45) Date of Patent: Aug. 17, 2010

(54) METHOD AND DEVICE FOR MOBILE OBJECT INFORMATION MANAGEMENT, AND COMPUTER PRODUCT

(75) Inventors: Kunikazu Takahashi, Kawasaki (JP); Kazuyuki Yasutake, Tokyo (JP); Nakaba Yuhara, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 853 days.

(21) Appl. No.: 10/847,476

(22) Filed: May 18, 2004

(65) Prior Publication Data
US 2005/0169502 A1 Aug. 4, 2005

(30) Foreign Application Priority Data
Jan. 29, 2004 (JP) ............................. 2004-021736

(51) Int. Cl.
*G06K 9/00* (2006.01)
(52) U.S. Cl. .................. 382/105; 382/104; 382/182; 382/310
(58) Field of Classification Search .............. 382/104, 382/105, 182, 310
See application file for complete search history.

(56) References Cited

U.S. PATENT DOCUMENTS

| | | | | |
|---|---|---|---|---|
| 5,418,864 A | * | 5/1995 | Murdock et al. | 382/309 |
| 5,768,451 A | * | 6/1998 | Hisamitsu et al. | 382/309 |
| 5,841,901 A | * | 11/1998 | Arai et al. | 382/187 |
| 6,121,898 A | * | 9/2000 | Moetteli | 340/933 |
| 6,185,338 B1 | * | 2/2001 | Nakamura | 382/229 |
| 6,269,188 B1 | * | 7/2001 | Jamali | 382/229 |
| 6,343,149 B1 | * | 1/2002 | Motoiwa | 382/209 |
| 6,553,131 B1 | * | 4/2003 | Neubauer et al. | 382/105 |
| 2002/0140577 A1 | * | 10/2002 | Kavner | 340/933 |

FOREIGN PATENT DOCUMENTS

| | | |
|---|---|---|
| JP | 04-060784 | 2/1992 |
| JP | 05-020489 | 1/1993 |
| JP | 07-146916 | 6/1995 |
| JP | 07-239913 | 9/1995 |
| JP | 11-338970 | 12/1999 |
| JP | 2003-22494 | 1/2003 |

OTHER PUBLICATIONS

Notice of Rejection issued by the Japanese Patent Office on Dec. 2, 2008 in Application No. 2004-021736 (2 pages with 3 pages of English translation).

* cited by examiner

*Primary Examiner*—Vikkram Bali
*Assistant Examiner*—Katrina Fujita
(74) *Attorney, Agent, or Firm*—Staas & Halsey LLP

(57) ABSTRACT

A method, device and computer program for mobile object information management program includes obtaining a first image by photographing identification information of a mobile object, executing character recognition process on the first image to obtain a first character recognition result, determining accuracy of the first character recognition result, registering, as the identification information corresponding to the mobile object, a plurality of first character recognition results, for each of which the accuracy is determined as low, and outputting the first character recognition results registered.

14 Claims, 14 Drawing Sheets

FIG.3

123b PASSING VEHICLE DATA

| PASSING LOCATION ID | PASSING DATE AND TIME | PASSING SPEED | RECOGNITION ACCURACY | LAND TRANSPORT OFFICE | TYPE OF VEHICLE | APPLICATION | SEQUENCE NUMBER | MATCH DETERMINATION FLAG |
|---|---|---|---|---|---|---|---|---|
| 3571-1-2 | 2004.1.11 12:03:32 | 50km/h | 0.8 | ○○ | 55 | TA | 1284 | 0 |
|  |  |  | 0.1 | ○○ | 55 | TA | 1264 | 0 |
| 3571-1-1 | 2004.1.11 12:03:54 | 45km/h | 0.05 | ○○ | 55 | TA | 1234 | 0 |
|  |  |  | 0.9 | ×× | 500 | SA | 4391 | 1 |
| ... | ... | ... | ... | ... | ... | ... | ... | ... |

FIG.5

173a MASTER DATA

| PASSING LOCATION ID | POSITION NAME | LANE | RUNNING DIRECTION | BEARING | MAP COORDINATE (X COORDINATE) | MAP COORDINATE (Y COORDINATE) |
|---|---|---|---|---|---|---|
| 3571-1-2 | ○○ INTERSECTION | MIDDLE LANE | TO CITY ○○ | NORTH | 1324 | 4142 |
| 3573-1-1 | ×× CROSSWALK | LEFT-HAND LANE | TO CITY ○○ | NORTH | 1535 | 2134 |
| ... | ... | ... | ... | ... | ... | ... |

FIG.6

173b SEARCHED VEHICLE DATA

| REGISTRATION DATE AND TIME | LAND TRANSPORT OFFICE | TYPE OF VEHICLE | APPLICATION | SEQUENCE NUMBER | COMMON NAME | COLOR | CHARACTERISTICS | REGISTRATION REASON | REGISTRANT |
|---|---|---|---|---|---|---|---|---|---|
| 2004.1.3 08:24 | OO | 55 | TA | 1284 | OO WAGON | WHITE | WAGON | SPEEDING | OTAOKO |
| 2004.1.5 15:18 | ×× | 500 | NA | 1425 | - | - | - | - | ×HATA×O |
| ... | ... | ... | ... | ... | ... | ... | ... | ... | ... |

FIG.7

173c PASSING VEHICLE DATA

| PASSING LOCATION ID | PASSING DATE AND TIME | PASSING SPEED | RECOG-NITION ACCURACY | LAND TRANSPORT OFFICE | TYPE OF VEHICLE | APPLICA-TION | SEQUENCE NUMBER | MATCH DETERMINA-TION FLAG |
|---|---|---|---|---|---|---|---|---|
| 3571-1-2 | 2004.1.11 12:03:32 | 50km/h | 0.8 | ○○ | 55 | TA | 1284 | 0 |
| | | | 0.1 | ○○ | 55 | TA | 1264 | 0 |
| | | | 0.05 | ○○ | 55 | TA | 1234 | 0 |
| 3571-1-1 | 2004.1.11 12:03:54 | 45km/h | 0.9 | ×× | 500 | SA | 4391 | 1 |
| ... | ... | ... | ... | ... | ... | ... | ... | ... |
| 3573-1-1 | 2004.1.11 12:11:21 | 40km/h | 0.9 | ○○ | 55 | TA | 1284 | 1 |
| ... | ... | ... | ... | ... | ... | ... | ... | ... |

FIG.8

| PASSING LOCATION ID | PASSING DATE AND TIME | PASSING SPEED | RECOG- NITION ACCURACY | LAND TRANSPORT OFFICE | TYPE OF VEHICLE | APPLICATION | SEQUENCE NUMBER |
|---|---|---|---|---|---|---|---|
| 3571-1-2 | 2004.1.11 12:03:32 | 50km/h | 0.8 | ○○ | 55 | TA | 1284 |
| | | | 0.1 | ○○ | 55 | TA | 1264 |
| | | | 0.05 | ○○ | 55 | TA | 1234 |
| 3573-1-1 | 2004.1.11 12:11:21 | 40km/h | 0.9 | ○○ | 55 | TA | 1284 |
| ... | ... | ... | ... | ... | ... | ... | ... |

173d HIT VEHICLE DATA

US 7,778,447 B2

METHOD AND DEVICE FOR MOBILE OBJECT INFORMATION MANAGEMENT, AND COMPUTER PRODUCT

BACKGROUND OF THE INVENTION

1) Field of the Invention

The present invention relates to a technology for mobile object information management that manage identification information of mobile objects and enable efficiently searching information about a mobile object.

2) Description of the Related Art

Conventionally, traffic monitoring systems that read registration information on license plates of vehicles, are used in order to monitor traffic of vehicles such as automobiles. In the traffic monitoring systems, registration information on license plates photographed by image pickup devices are subject to a character recognition process, and its results as well as information about photographing locations and photographing time are stored in a database. As a result, information concerning the time and the locations, in which a vehicle with specific registration information runs, can be easily searched.

FIG. 14 illustrates installation of a roadside device of a conventional traffic monitoring system. An image pickup device 2 that photographs vehicles is installed on a pole 1 that supports a traffic signal. A recognizing device 3 that extracts license plate portions from the images and executes the character recognizing process on registration information is installed on the side of the pole 1.

The results of character recognition are transmitted to a server in a traffic-monitoring center via a network, and are stored into a database together with information about photographing location and photographing time. The database is used for applications such as searching certain time and location where a specific vehicle was present.

However, the roadside device of the traffic monitoring system shown in FIG. 14 is installed on a road in a fixed manner. Therefore, once the device is installed, it is not easy to move the device to a different location. Japanese Patent Application Laid-open No. 2003-22494 discloses a mobile object character recognizing system that can be transported by an automobile or the like, and the installation location of which, can be easily changed.

In the mobile object character recognizing system, to search a specific vehicle, registration information is input by a user in advance, and then it is determined whether the registration information matches with registration information obtained after character recognition. The search results are displayed.

However, if character recognition result of the registration information is inaccurate, the vehicle with the specific registration information is searched based on the inaccurate registration information.

The character recognition techniques currently available are not accurate enough. Consequently, as mentioned above, if there is an error in character recognition, a completely irrelevant vehicle is searched, thereby confusing the user.

A possible solution to this problem may be that the character recognition result for which the accuracy is not sufficiently high should not be taken into consideration. However, sometimes identification information of a vehicle, though not accurate enough, may prove useful. Therefore, an important object is to manage character recognition information in a balanced manner based on an extent of accuracy.

SUMMARY OF THE INVENTION

It is an object of the invention to at least solve the problems in the conventional technology.

A computer program according to an aspect of the present invention makes a computer execute obtaining a first image by photographing identification information of a mobile object; executing character recognition process on the first image to obtain a first character recognition result; determining accuracy of the first character recognition result; registering, as the identification information corresponding to the mobile object, a plurality of first character recognition results, for each of which the accuracy is determined as low; and outputting the first character recognition results registered.

A mobile object information management device according to another aspect of the present invention includes a photographing unit that obtains a first image by photographing identification information of a mobile object; a character recognizing unit that executes character recognition process on the first image to obtain a first character recognition result; a first accuracy determining unit that determines accuracy of the first character recognition result; a recognition result registering unit that registers, as the identification information corresponding to the mobile object, a plurality of first character recognition results, for each of which the accuracy is determined as low; and a character recognition result output unit that outputs the first character recognition results registered.

A mobile object information management method according to still another aspect of the present invention includes obtaining a first image by photographing identification information of a mobile object; executing character recognition process on the first image to obtain a first character recognition result; determining accuracy of the first character recognition result; registering, as the identification information corresponding to the mobile object, a plurality of first character recognition results, for each of which the accuracy is determined as low; and outputting the first character recognition results registered.

A mobile object information management system according to still another aspect of the present invention includes a photographing unit that obtains a first image by photographing identification information of a mobile object; a character recognizing unit that executes character recognition process on the first image to obtain a first character recognition result; a first accuracy determining unit that determines accuracy of the first character recognition result; a recognition result registering unit that registers, as the identification information corresponding to the mobile object, a plurality of first character recognition results, for each of which the accuracy is determined as low; and a character recognition result output unit that outputs the first character recognition results registered.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 illustrates one example of a passing vehicle data stored in the recognizing device;

FIG. 5 illustrates one example of master data stored in the mobile object information management device;

FIG. 6 illustrates one example of searched vehicle data stored in the mobile object information management device;

FIG. 7 illustrates one example of passing vehicle data stored in the mobile object information management device;

FIG. 8 illustrates one example of hit vehicle data stored in the mobile object information management device;

DETAILED DESCRIPTION

Exemplary embodiments of a method, device, and a computer program for mobile object information management according to the present invention are explained below in detail with reference to the accompanying drawings. According to the present invention, a character recognizing process is executed on registration information marked on license plates of vehicles such as automobiles, and the registration information of the vehicles obtained as the result of the process is managed.

Figure 1:
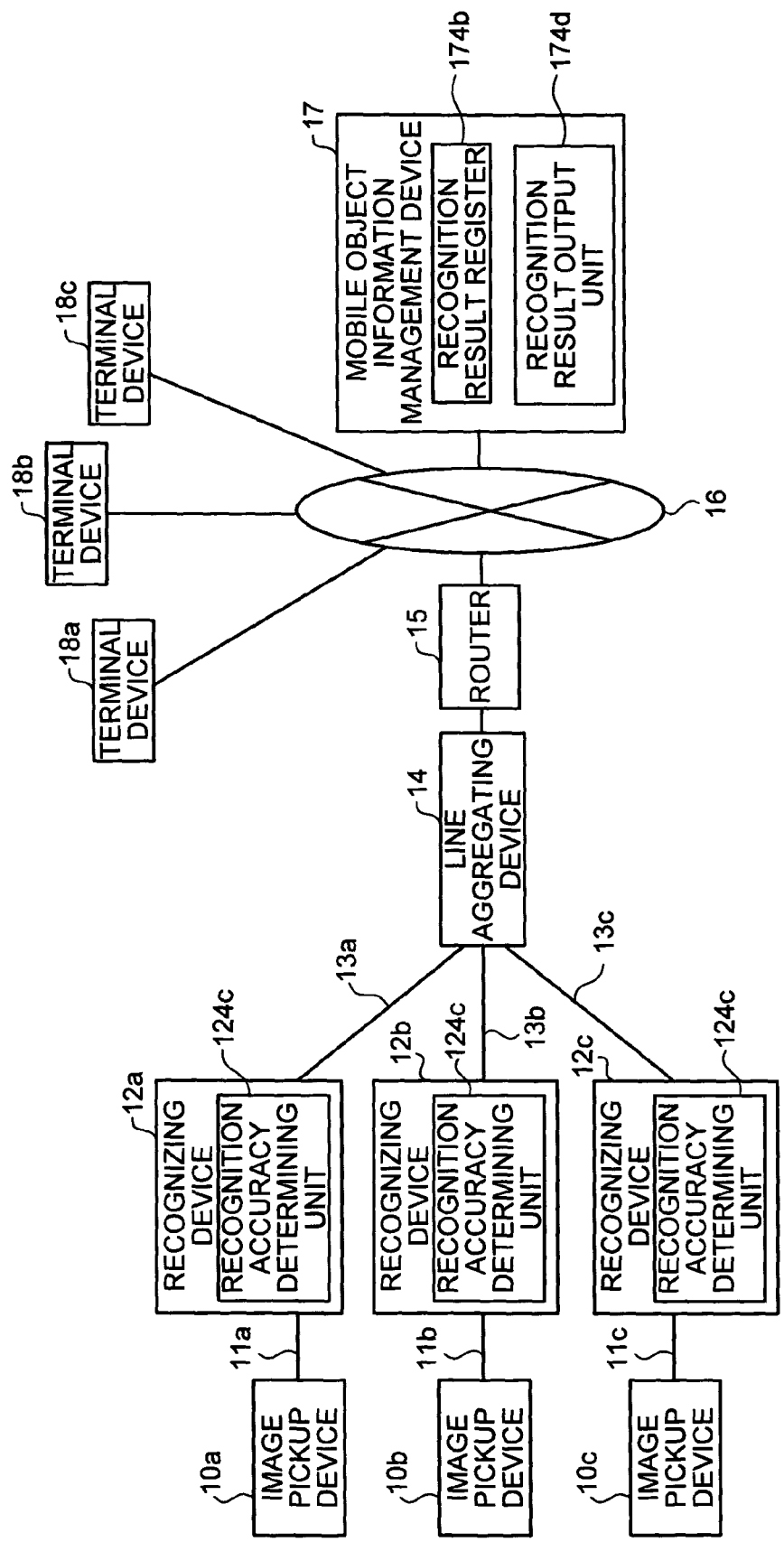
FIG. 1 illustrates a concept of a mobile object information management system.

FIG. 1 illustrates a concept of a mobile object information management system according to an embodiment of the present invention. Image pickup devices 10a to 10c are connected to recognizing devices 12a to 12c via National Television Standards Committee (NTSC) signal lines 11a to 11c, respectively. The recognizing devices 12a to 12c are connected to a line aggregating device 14 via dedicated lines 13a to 13c. The line aggregating device 14 is connected to a mobile object information management device 17 via a router 15 and a local area network 16. The mobile object information management device 17 is connected to terminal devices 18a to 18c via the local area network 16.

The image pickup devices 10a to 10c photograph images of vehicles. The recognizing devices 12a to 12c execute a character recognizing process to read registration information marked on license plates from the images of vehicles photographed by the image pickup devices 10a to 10c.

The recognizing devices 12a to 12c overlap templates of character patterns with images of the characters on the license plates to determine how much the character shapes match with each other, and specifically, to determine for each character, how many pixels of the pattern of the template match with the characters in the image. The recognizing devices 12a to 12c set a minimum value of the overlapping proportion as accuracy of the character recognition for the image of the license plate.

Further, the recognizing devices 12a to 12c have a recognition accuracy determining unit 124c each. If the accuracy of the character recognition is lower than a predetermined value, the recognition accuracy determining unit 124c sets multiple character recognition results.

Specifically, characters in which the overlapping proportion of the character shapes is less than a predetermined value are replaced by candidate characters, and multiple candidates of the character recognition results are set. Character candidates are selected in descending order of overlapping proportion of the character shape. If the accuracy of the character recognition is higher than a predetermined value, only one character recognition result is set.

The character recognition results obtained by the recognizing devices 12a to 12c as well as information about locations and time at which the vehicle was photographed are collected by the line aggregating device 14 and transmitted to the mobile object information management device 17 via the router 15 and the local area network 16.

The mobile object information management device 17 includes a recognition result registering unit 174b and a recognition result output unit 174d. The recognition result registering unit 174b stores, into a database, one or multiple character recognition result(s) transmitted by the recognizing devices 12a to 12c as well as the information about the locations and time at which the vehicle was photographed.

The recognition result output unit 174d accepts a vehicle search request from users who operate the terminal devices 18a to 18c, and outputs information about positions and time of a vehicle searched from the database based on the character recognition result, as well as the character recognition result, to the terminal devices 18a to 18c.

When the accuracy of character recognition is low, multiple character recognition candidates are set as the character recognition result. Consequently, even if the character recognition is not accurate enough, the user can acquire the vehicle information efficiently.

Figure 2:
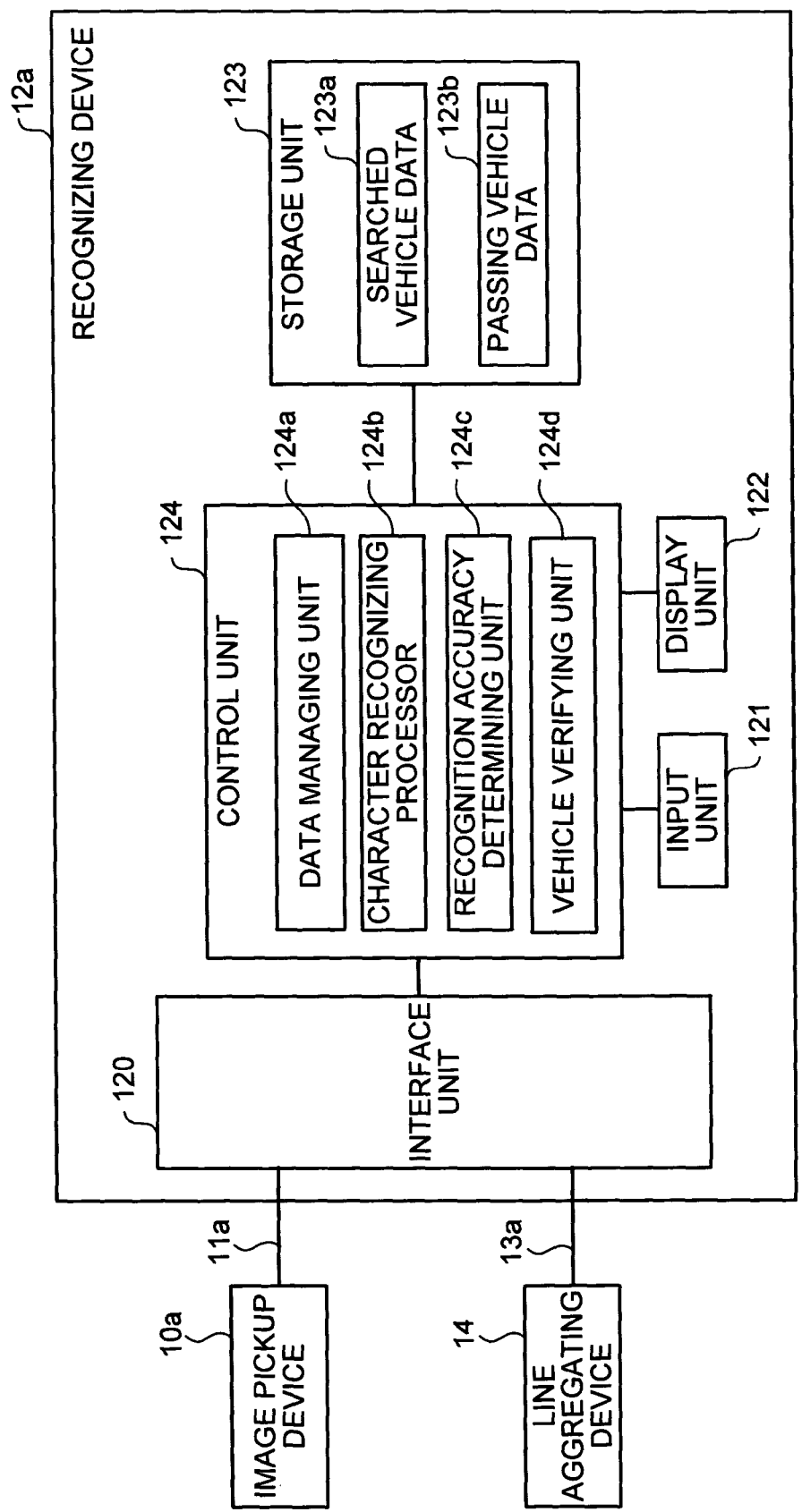
FIG. 2 is a functional block diagram of a recognizing device.

The functional constitution of the recognizing devices 12a to 12c is explained below. FIG. 2 is a functional block diagram of the recognizing device 12a. The recognizing devices 12a to 12c have identical functional constitution, and therefore, the functional constitution of only the recognizing device 12a is explained here. The recognizing device 12a has an interface unit 120, an input unit 121, a display unit 122, a storage unit 123, and a control unit 124.

The interface unit 120 sends/receives data to/from the image pickup device 10a via the NTSC signal line 11a, and sends/receives data to/from the line aggregating device 14 via the dedicated line 13a. The input unit 121 is an input device such as a keyboard and a mouse, and the display unit 122 is a display device.

The storage unit 123 is a storage device such as a hard disc device, and stores searched vehicle data 123a and passing vehicle data 123b. The searched vehicle data 123a include registration information of vehicles that users want searched and that are input through the terminal devices 18a to 18c.

The passing vehicle data 123b include data of vehicles photographed by the image pickup device 10a. FIG. 3 illustrates one example of the passing vehicle data 123b. The passing vehicle data 123b include passing location ID, passing date and time, passing speed, recognition accuracy, Land Transport Office, type of vehicle, application, sequence number and match determination flag.

The passing location ID is a number that specifies a position at which the vehicle is photographed, a vehicle passing lane, and a vehicle running direction all at once. For example, in the passing location ID "3571-1-2", the number "3571" identifies a position at which the vehicle is photographed, that is, the position where the image pickup device 10a is installed. "1" indicates a vehicle passing lane, and "2" designates a vehicle running direction.

The position at which the vehicle is photographed is set in each of the recognizing devices 12a to 12c. An image analyzer (not shown) analyzes an image of the photographed vehicle to obtain the vehicle passing lane and the running direction.

The passing date and time are the date and time when the vehicle is photographed, and the passing speed a vehicle speed measured by a speed detector (not shown). The recognition accuracy indicates the accuracy of the character recognizing process executed on the image of the registration information marked on the license plate of the vehicle.

In the character recognizing process, the template matching is carried out for each character in the registration information. The templates of the characters are overlapped with the characters in the image, to determine how much the two match. A minimum proportion of the character overlapping obtained in such a manner is set as the recognition accuracy, and when the shapes of the characters match with each other completely, the accuracy is "1".

The Land Transport Office, type of vehicle, application, and sequence number of the vehicle are obtained by executing the character recognizing process on the image on the license plate. The value of the match determination flag is set based on whether the templates match with the images of the characters on the license plate when the image of the license plate is subject to the character recognition process. Specifically, if recognition accuracy is equal to or more than a predetermined value (0.9, for example), "1" is stored as the match determination flag, and if the recognition accuracy is lower than the predetermined value, "0" is stored.

If the recognition accuracy is lower than the predetermined value, multiple registration information candidates are registered in the passing vehicle data 123b. For example, in FIG. 3, the recognition accuracy "0.8" is lower than "0.9", and therefore, a registration information candidate having sequence number "1284", "1264", and "1234" are all registered for the same entry "3571-1-2".

With reference to FIG. 2, the control unit 124 entirely controls the recognizing device 12a, and includes a data managing unit 124a, a character recognizing processor 124b, a recognition accuracy determining unit 124c, and a vehicle verifying unit 124d.

The data managing unit 124a receives the registration information of the vehicle searched by the user from the mobile object information management device 17, and stores it as the searched vehicle data 123a. Further, the data managing unit 124a transmits the passing vehicle data 123b to the mobile object information management device 17 via the line aggregating device 14.

The character recognizing processor 124b executes the character recognizing process on the image of the license plate of the vehicle photographed by the image pickup device 10a, to read the registration information on the license plate. Specifically, the character recognizing processor 124b carries out template matching on the image of the license plate, to recognize characters. The character recognizing processor 124b calculates the overlapping proportion of the pixels composing the characters in the photographed image that match the pattern of the template for each character, as the recognition accuracy of the registration information.

The recognition accuracy determining unit 124c compares a predetermined standard value with the recognition accuracy. If the recognition accuracy is higher than the standard value, the recognition accuracy determining unit 124c stores only one character recognition result in the passing vehicle data 123b. Whereas, if the recognition accuracy is lower than the standard value, the recognition accuracy determining unit 124c stores multiple character recognition results in the passing vehicle data 123b. In addition to the registration information, the recognition accuracy determining unit 124c also stores passing location ID, passing date and time, passing speed, recognition accuracy, and the match determination flag in the passing vehicle data 123b.

The vehicle verifying unit 124d compares the registration information of the vehicle stored in the searched vehicle data 123a with the registration information about the vehicle being subject to the character recognizing process to determine whether they match. If the two match with each other, the vehicle verifying unit 124d transmits the information of the matched passing vehicle (hereinafter, "hit vehicle") to the mobile object information management device 17. The vehicle verifying unit 124d requests the mobile object information management device 17 to store the information about the hit vehicle as hit vehicle data 173d therein.

Figure 4:
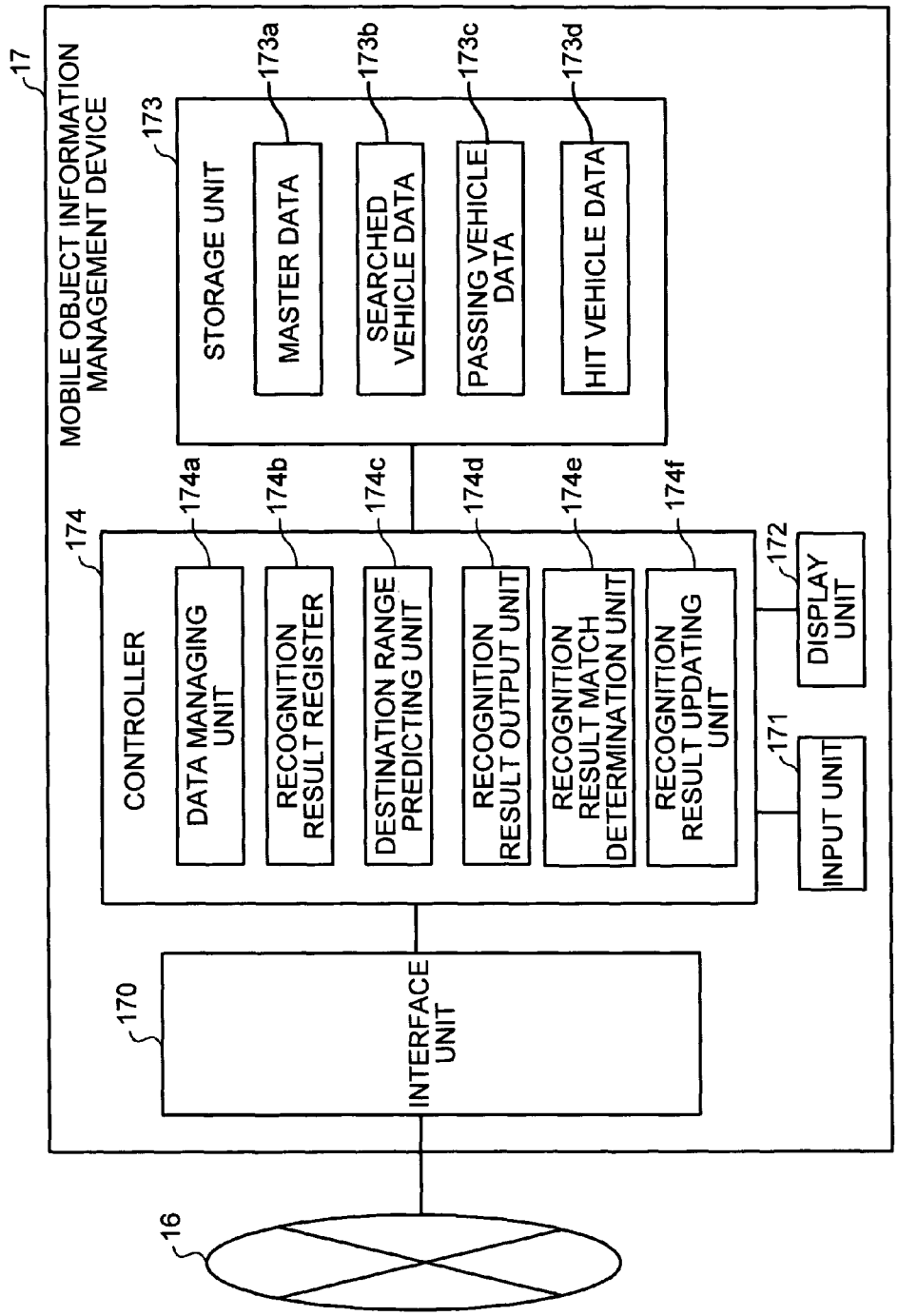
FIG. 4 is a functional block diagram of a mobile object information management device.

FIG. 4 is a functional block diagram of the mobile object information management device 17 shown in FIG. 1. The mobile object information management device 17 includes an interface unit 170, an input unit 171, a display unit 172, a storage unit 173, and a controller 174.

The interface unit 170 sends/receives data to/from the terminal devices 18a to 18c and the line aggregating device 14 via the local area network 16. The input unit 171 is an input device such as a keyboard and a mouse, and the display unit 122 is a display device.

The storage unit 173 is a storage device such as a hard disc device, and stores master data 173a, searched vehicle data 173b, passing vehicle data 173c, and hit vehicle data 173d therein.

The master data 173a include information related with passing location IDs to be stored in the passing vehicle data 123b. FIG. 5 illustrates one example of the master data 173a. The master data 173a include passing location ID, position name, lane, running direction, bearing, map coordinate (x-coordinate), and map coordinate (y-coordinate).

The passing location ID is similar to the passing location ID stored in the passing vehicle data 123b. The position name, the lane, and the running direction are a position name, a lane, and a running direction specified by the passing location ID. The bearing is related with the running direction. The map coordinate (x-coordinate) and the map coordinate (y-coordinate) are the coordinates on a map that displays the position of the vehicle, and are coordinates of the position indicated by the passing location ID.

With reference to FIG. 4, the searched vehicle data 173b include the registration information of the vehicle that a user wants to search, and that the user sends through the terminal devices 18a to 18c. FIG. 6 illustrates one example of the searched vehicle data 173b. The searched vehicle data 173b include registration date and time, Land Transport Office, type of vehicle, application, sequence number, common name, color, characteristics, registration reason, and registrant.

The registration date and time are the date and time when the search request by the user is accepted. The Land Transport Office, type of vehicle, application, and sequence number are registration information marked on the license plate of the vehicle to be searched. The common name, the color, and the characteristics are the common name, the color and the characteristics of the vehicle to be searched. The registration reason is a reason for searching the vehicle, and the registrant is a name of the user who makes the search request.

With reference to FIG. 4, the passing vehicle data 173c include information about a passing vehicle and are transmitted by the recognizing devices 12a to 12c. FIG. 7 illustrates one example of the passing vehicle data 173c. The passing vehicle data 173c include passing location ID, passing date and time, passing speed, recognition accuracy, Land Transport Office, type of vehicle, application, sequence number, and match determination flag. The respective data are similar to the corresponding data stored in the passing vehicle data 123b shown in FIG. 3.

Information about all vehicles, whose characters on license plates are recognized by the recognizing devices 12a to 12c, is registered in the passing vehicle data 173c. Therefore, the database can be searched whenever required, to find out when and where a specific vehicle was running.

With reference to FIG. 4, the hit vehicle data 173d include data about a hit vehicle and are transmitted from the recognizing devices 12a to 12c. FIG. 8 illustrates one example of the hit vehicle data 173d. The hit vehicle data 173d include passing location ID, passing date and time, passing speed, recognition accuracy, Land Transport Office, type of vehicle, application, and sequence number. The respective data are similar to the corresponding data stored in the passing vehicle data 123b sown in FIG. 3.

With reference to FIG. 4, the controller 174 controls the mobile object information management device 17 entirely, and includes a data managing unit 174a, a recognition result register 174b, a destination range predicting unit 174c, a recognition result output unit 174d, a recognition result match determination unit 174e, and a recognition result updating unit 174f.

The data managing unit 174a executes a data adding process, a data deleting process or the like on the master data 173a. The data managing unit 174a accepts the registration information about the vehicle to be searched from the terminal devices 18a to 18c, and stores the information as the searched vehicle data 173b therein. At this time, the data managing unit 174a outputs an acceptance screen, on which the registration information is accepted, to the terminal devices 18a to 18c.

Figure 9:
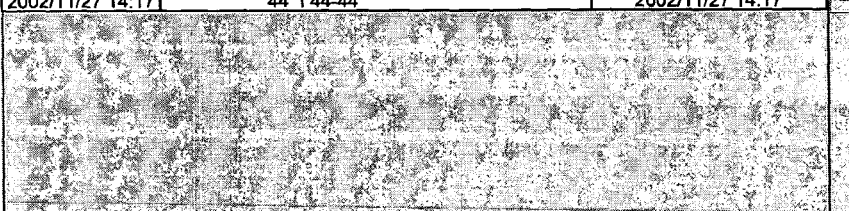
FIG. 9 illustrates one example of registration information acceptance screens that are used to input the registration information.

FIG. 9 illustrates one example of registration information acceptance screens 90 to 92 that are used to input the registration information. On the acceptance screen 90, Land Transport Office, type of vehicle, application, and sequence number to be stored in the searched vehicle data 173b are input. On the acceptance screen 91, registration date and time, common name, color, characteristics, registration reason, and registrant are input. The contents of the accepted data can be checked on the acceptance screen 92 that is displayed after the input of the data.

With reference to FIG. 4, the recognition result register 174b registers the vehicle information such as character recognition results of the license plate transmitted from the recognizing devices 12a to 12c into the passing vehicle data 173c. The recognition result register 174b also registers the vehicle information about the hit vehicles into the hit vehicle data 173d. The destination range predicting unit 174c predicts a destination range of the vehicle within predetermined time based on the information such as the passing speed and the running direction of the hit vehicle stored in the hit vehicle data 173d.

Figure 10:
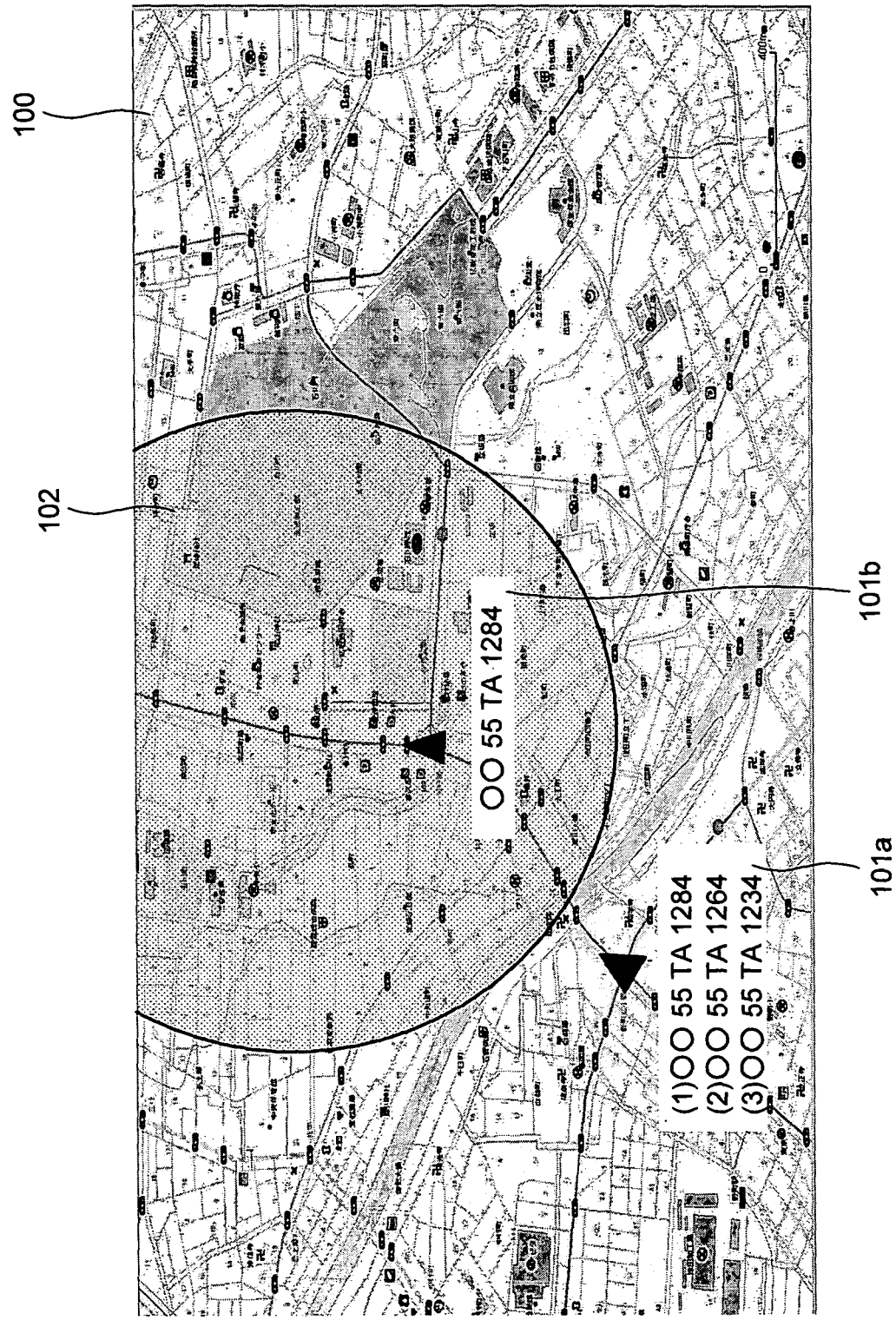
FIG. 10 illustrates one example of a map screen that displays the vehicle information.

The recognition result output unit 174d outputs a map screen, on which the vehicle information registered in the hit vehicle data 173d is displayed, to the terminal devices 18a to 18c. Further, not only the image but also sound may be output as the vehicle information. FIG. 10 illustrates one example of the map screen 100 that displays the vehicle information.

As shown in FIG. 10, the map screen 100 shows character recognition results 101a and 101b of the image of the license plate related with a position indicated by the passing location ID.

If the recognition accuracy of the character recognition is lower than the standard value, multiple character recognition results 101a are displayed. If the recognition accuracy of the character recognition is higher than the standard value, only one character recognition result 101b is displayed. Further, the map screen 100 shows a destination range 102 of the vehicle, as predicted by the destination range predicting unit 174c.

In the FIG. 10, one or multiple character recognition result(s) is (are) displayed. Alternatively, the corresponding recognition accuracy of the character recognition results may be displayed along with the character recognition results. As a result, the user can check how accurate the character recognition results are.

If the character recognition accuracy is higher than the standard value, a single character recognition result is registered in the hit vehicle data 173d by the recognition result register 174b. At this time, the recognition result match determination unit 174e searches the hit vehicle data 173d for an entry containing multiple character recognition results having character recognition accuracy lower than the standard value.

When such vehicle information are found in the hit vehicle data 173d, the recognition result match determination unit 174e determines whether the multiple character recognition results include the single character recognition result newly registered.

The recognition result match determination unit 174e executes the determination process on the vehicle whose character recognition results are registered, only when the position of the vehicle, whose single character recognition result is registered, is within the destination range predicted by the destination range predicting unit 174c.

If the recognition result match determination unit 174e determines that the character recognition results registered in the hit vehicle data 173d include the character recognition result the newly registered single character recognition result, the recognition result updating unit 174f replaces the multiple character recognition results by the newly registered single character recognition result.

For instance, in the example shown in FIG. 10, the character recognition results 101a and the destination range 102 predicted for the vehicle whose character recognition results 101a are registered are displayed. Thereafter, the character recognition is carried out once again on the image of the license plate of the vehicle, and a newly registered character recognition result 101b, which has high character recognition accuracy, is displayed.

In the example of FIG. 10, the position of the vehicle related with the character recognition result 101b is within the destination range 102. Therefore, it is determined whether the character recognition results 101a include the character recognition result 101b.

In this example, the character recognition results 101a include the character recognition result 101b "OO 55 TA 1284", the character recognition results 101a are replaced by the character recognition result 101b.

Figure 11:
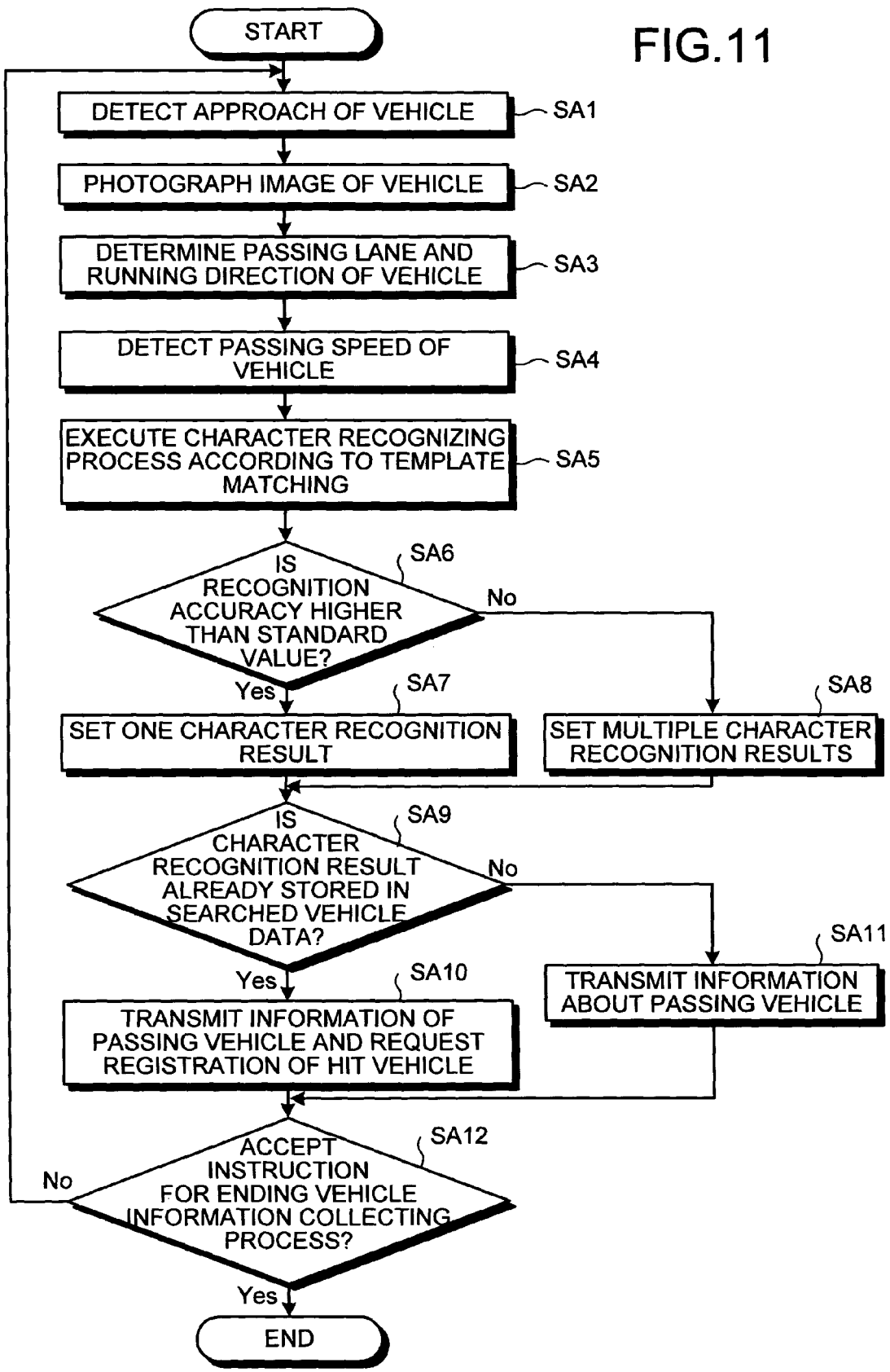
FIG. 11 is a flowchart of a vehicle information collecting process.

A vehicle information collecting process executed by the mobile object information management system is explained below with reference to FIG. 11. The image pickup devices 10a to 10c detect approach of a vehicle (step SA1), and photograph images of the vehicle (step SA2). The image analyzers (not shown) of the recognizing devices 12a to 12c analyze the photographed images, to determine a lane through which the vehicle passes and a running direction of the vehicle (step SA3). The speed detector (not shown) detects a passing speed of the vehicle (step SA4).

The character recognizing units 124b of the recognizing devices 12a to 12c execute the character recognizing process on the images of the registration information that is marked on the license plate of the vehicle according to the template matching process (step SA5).

The recognition accuracy determining units 124c compare a predetermined standard value with the character recognition accuracy. If the recognition accuracy is higher than the standard value (Yes at step SA6), the recognition accuracy determining units 124c set only one character recognition result with the highest recognition accuracy (step SA7). However, if the recognition accuracy is lower than the standard value (No at step SA6), the recognition accuracy determining units 124c set multiple character recognition results in descending order of recognition accuracy (step SA8).

After step SA7 or SA8, the vehicle verifying units 124d check whether the searched vehicle data 123a includes the registration information of the vehicle undergoing character recognition (step SA9).

If the registration information of the vehicle undergoing character recognition is found in the searched vehicle data 123a (Yes at step SA9), the information about the passing vehicle, that is, the passing location, the passing lane, the running direction, the passing time and date, the passing speed, the recognition accuracy, and the character recognition result of the registration information is transmitted to the mobile object information managing unit 17. At the same time, the mobile object information management device 17 is requested to register the information of the passing vehicle in the hit vehicle data 173d (step SA10).

If the registration information of the vehicle undergoing character recognition is not found in the searched vehicle data 123a (No at step SA9), the information of the passing vehicle, that is, the passing location, the passing lane, the running direction, the passing date and time, the passing speed, the recognition accuracy, and the character recognition result of the registration information is transmitted to the mobile object information management device 17 (step SA11).

After step SA10 or SA11, the data managing unit 124a checks whether there is an instruction to end the vehicle information collecting process (step SA12). If the data managing unit 124a does not receive the end instruction (No at step SA12), the sequence returns to step SA1. However, if the data managing unit 124a receives the end instruction (Yes at step SA12), the vehicle information collecting process ends.

Figure 12:
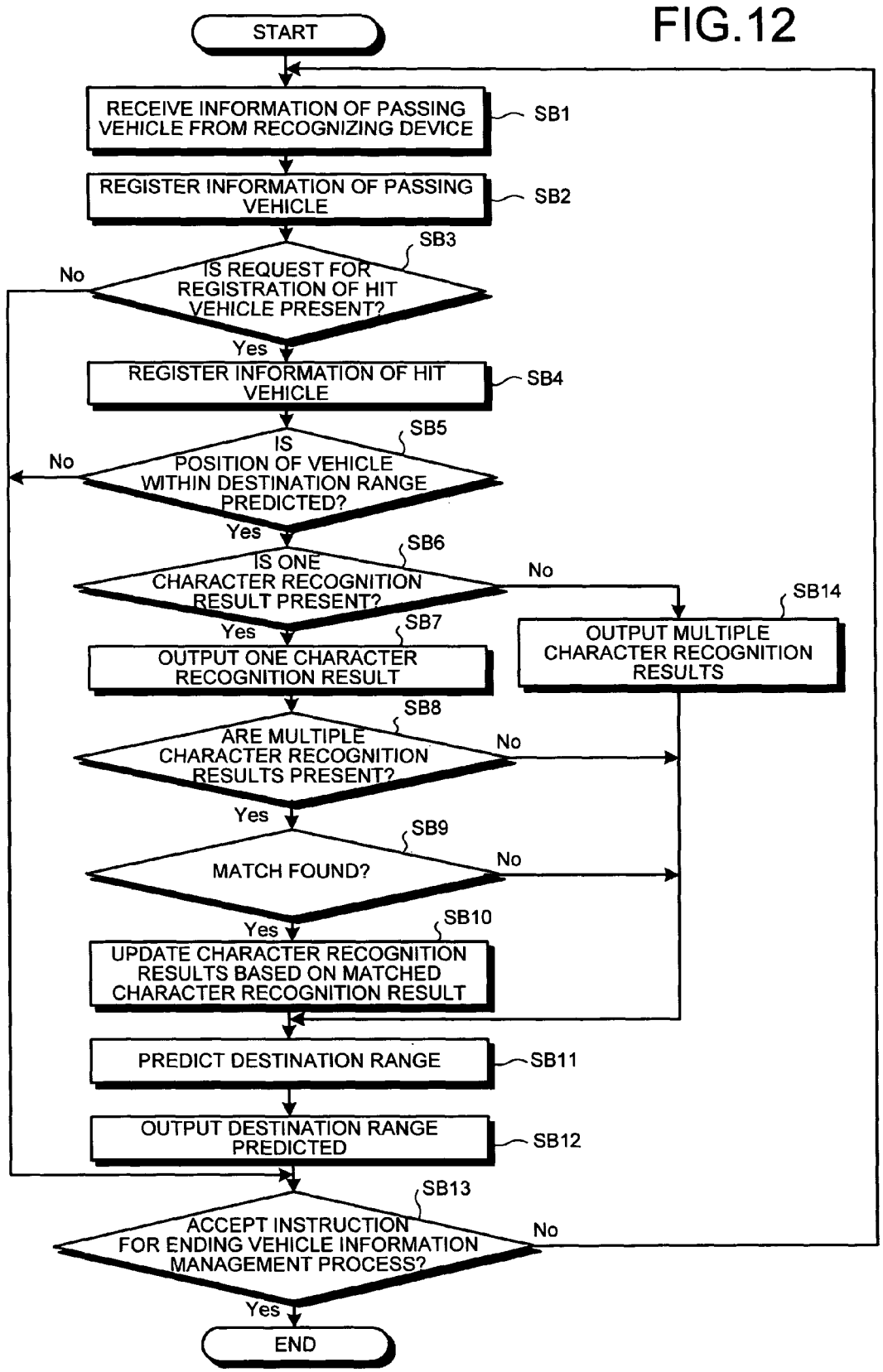
FIG. 12 is a flowchart of a vehicle information management process.

A vehicle information management process executed by the mobile object information management system is explained below with reference to FIG. 12. The recognition result register 174b of the mobile object information management device 17 receives the information of the passing vehicle from the recognizing devices 12a to 12c (step SB1), and registers the information received, into the passing vehicle data 173c (step SB2).

The recognition result register 174b checks whether a request for registration of a hit vehicle has been received from the recognizing devices 12a to 12c (step SB3). If the request for registration of a hit vehicle has not been received (No at step SB3), the sequence proceeds to step SB13, and the data managing unit 174a checks whether there is an instruction to end the vehicle information management process (step SB13).

If there is no end instruction (No at step SB13), the sequence returns to step SB1. If there is an end instruction (Yes at step SB13), the data managing unit 174a ends the vehicle information management process.

If there is a request for the registration of a hit vehicle (Yes at step SB3), the recognition result register 174b registers the information of the hit vehicle in the hit vehicle data 173d (step SB4).

Thereafter, the recognition result match determination unit 174e determines whether the position of the passing vehicle is within the destination range predicted by the destination range predicting unit 174c (step SB5). If the position of the passing vehicle is out of the destination range (No at step SB5), the sequence proceeds to step SB13.

If the position of the passing vehicle is within the destination range (Yes at step SB5), the recognition result output unit 174d checks whether a single character recognition result is registered in the hit vehicle data 173d corresponding to the image of the license plate (step SB6). If there are multiple character recognition results (No at step SB6), the recognition result output unit 174d outputs the multiple character recognition results corresponding to the position of the passing vehicle on the map (step SB14).

Thereafter, the destination range predicting unit 174c predicts the destination range of the passing vehicle within predetermined time (step SB11), and outputs the predicted destination range to be displayed on the map that is output by the recognition result output unit 174d (step SB12). The sequence proceeds to step SB13.

If only one character recognition result is registered in the hit vehicle data 173d corresponding to the image of the license plate (Yes at step SB6), the recognition result output unit 174d outputs the character recognition result corresponding to the position of the passing vehicle on the map (step SB7).

The recognition result match determination unit 174e checks whether the information of the hit vehicle with the character recognition results is already registered in the hit vehicle data 173d (step SB8). If the information about the hit vehicle with the character recognition results is not present (No at step SB8), the sequence proceeds to step SB11.

However, if the information about the hit vehicle with the character recognition results is present (Yes at step SB8), the recognition result match determination unit 174e checks whether the character recognition result match with the character recognition results output at step SB7 (step SB9). If no match is found (No at step SB9), the sequence proceeds to step SB11.

If a match is found (Yes at step SB9), the recognition result updating unit 174f updates the character recognition results based on the character recognition result matched (step SB10). The sequence proceeds to step SB11.

This embodiment explains the method of operation of the mobile object information management system, but the respective functions of the mobile object information management system are realized in the following manner. A computer reads the program for realizing the functions of the mobile object information management system from a computer-readable recording medium into which the program is recorded.

Figure 13:
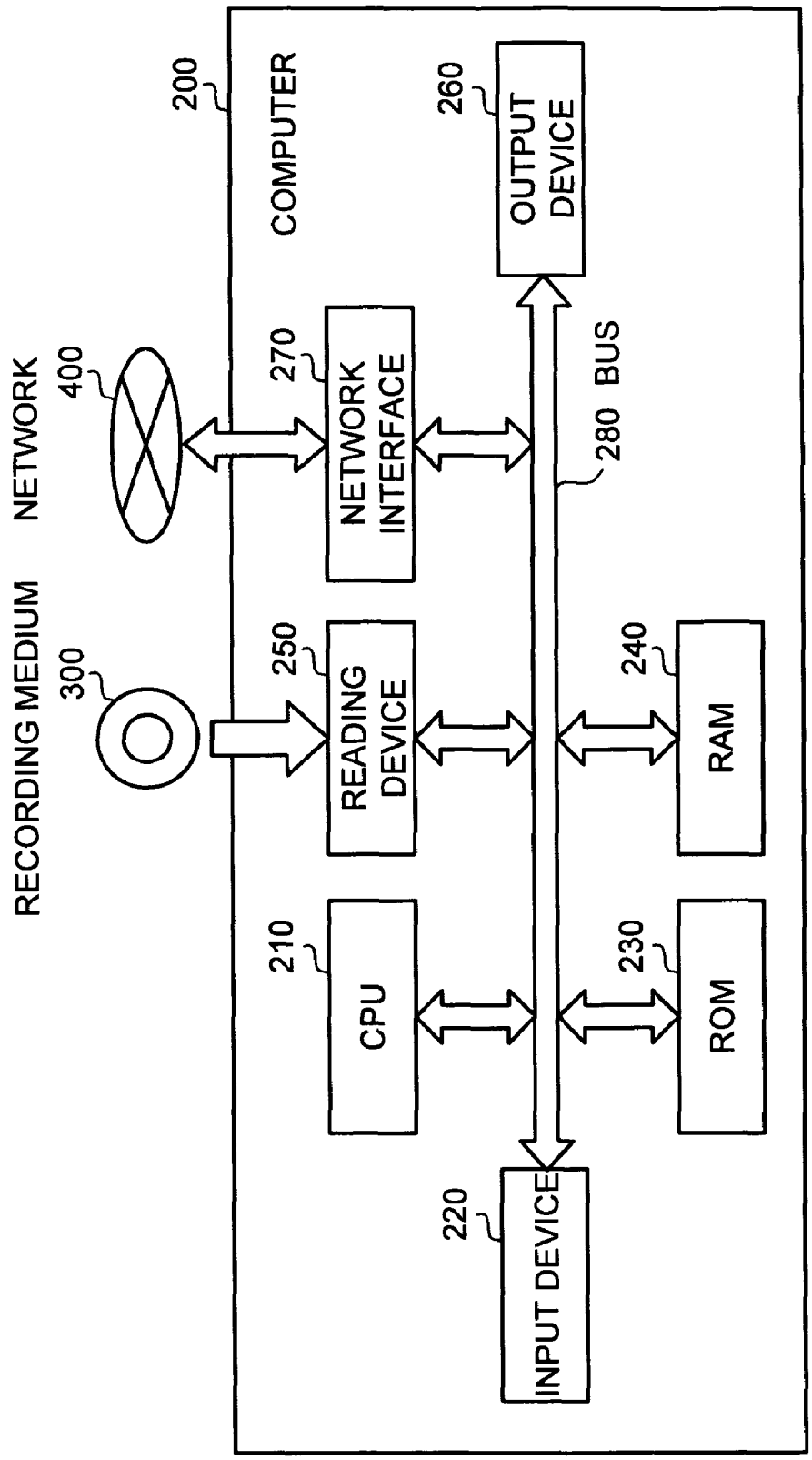
FIG. 13 illustrates hardware constitution of a computer that realizes the functions of the mobile object information management system.
Figure 14:
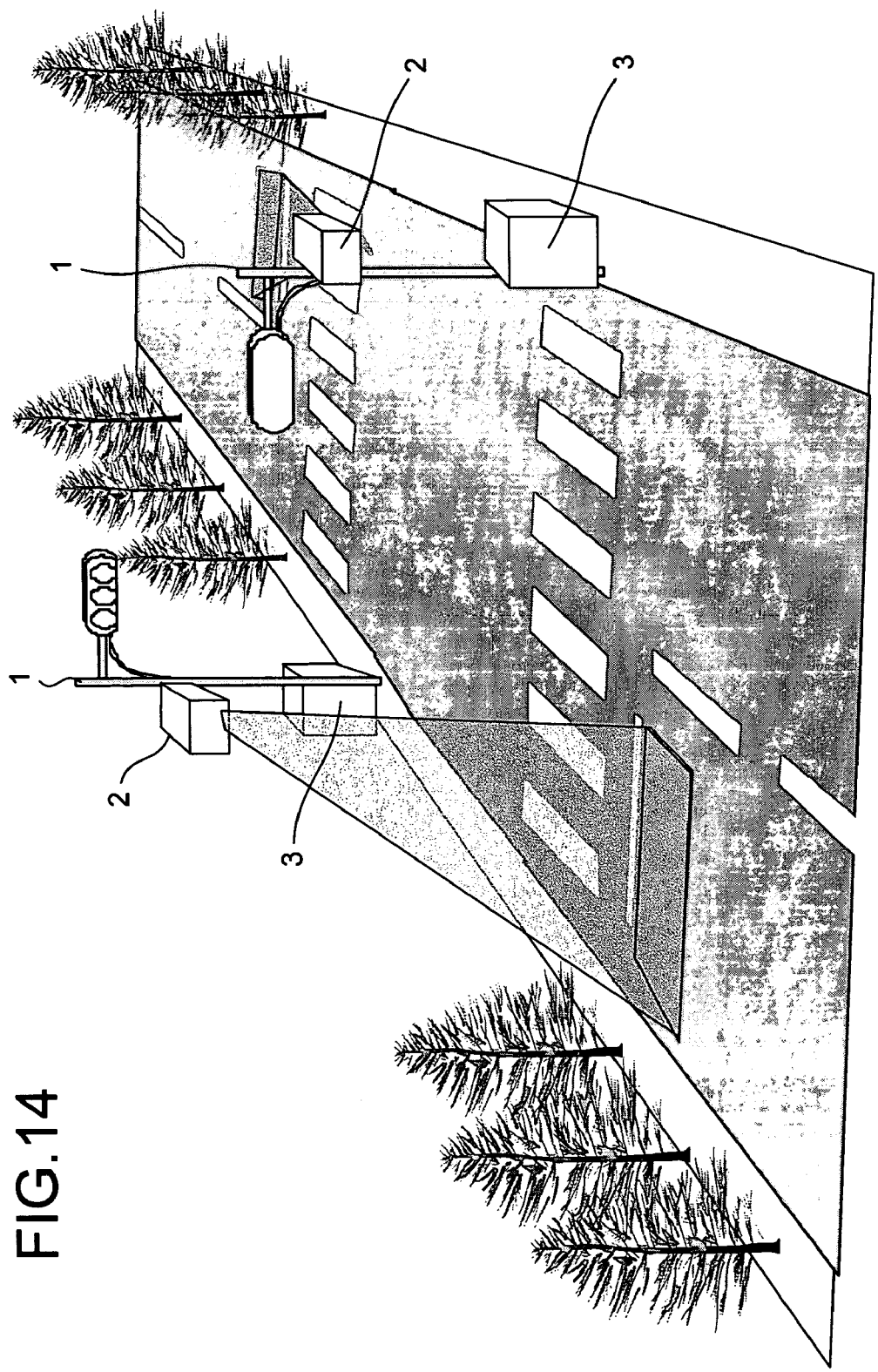
FIG. 14 illustrates installation of a roadside device of a conventional traffic monitoring system.

FIG. 13 illustrates the hardware constitution of a computer 200 that realizes the functions of the mobile object information management system. A central processing unit (CPU) 210, an input device 220, a read only memory (ROM) 230, a random access memory (RAM) 240, a reading device 250, an output device 260, and a network interface 270 are connected by a bus 280 in the computer 200. The CPU 210 executes the programs. The input device 220 includes a keyboard and a mouse. The ROM 230 stores various data. The RAM 240 stores operation parameters or the like. The reading device 250 reads the programs from the recording medium 300, into which the programs for realizing the functions of the mobile object information management system are recorded. The output device 260 includes a display or a printer. The network interface 270 sends/receives data to/from another computer via a network 400 such as the Internet.

The CPU 210 reads the programs recorded in the recording medium 300 via the reading device 250, and executes the program. An optical disc, a flexible disc, a CD-ROM, a hard disc, or the like may be used as the recording medium 300. The programs may be introduced into the computer 200 via the network 400 such as the Internet.

In this embodiment, the recognition accuracy determining units 124c of the recognizing devices 12a to 12c determine the accuracy of the character recognition executed on a first image obtained by photographing a license plate of a vehicle. If the character recognition accuracy is determined as low, the recognition result register 174b of the mobile object information managing unit 17 registers multiple character recognition results as the registration information of the vehicle and outputs the registered character recognition results. Accordingly, even if the character recognition is not accurate enough, a user can acquire the information about a vehicle.

However, if the character recognition accuracy is determined as high, the recognition result register 174b of the mobile object information management device 17 registers one character recognition result as the registration information about the vehicle. Therefore, the user can acquire accurate information about the vehicle.

In this embodiment, after the recognition result output unit 174b of the mobile object information management device 17 outputs multiple character recognition results, the recognition accuracy determining units 124c of the recognizing devices 12a to 12c determine the accuracy of the character recognition executed on a second image obtained by photographing a license plate of a vehicle. If the recognition accuracy determining units 124c determine that the accuracy of the second character recognition is high, the recognition result match determining unit 174e of the mobile object information management device 17 determines whether the already registered character recognition results include the second character recognition result. If the recognition result match determination unit 174e determines that the already registered character recognition results include the second character recognition result, the recognition result updating unit 174f of the mobile object information management device 17 updates the registered character recognition results based on the second character recognition result. Accordingly, if the registered character recognition results are not accurate enough, the inaccuracy is eliminated based on the second character recognition result. As a result, the user can acquire accurate information about a vehicle.

In this embodiment, when the recognition result register 174b of the mobile object information management device 17 registers the character recognition results as the registration information about the vehicle, the destination range of a vehicle within predetermined time is predicted. Therefore, the user can acquire the information about the destination range of the vehicle efficiently.

In this embodiment, the recognition result match determination unit 174e of the mobile object information management device 17 determines whether the position of a photographed vehicle on the second image is within the destination range. If the position of the mobile object is within the destination range, the recognition result match determination unit 174e determines whether the registered character recognition results include the second character recognition result. Therefore, if the position of the vehicle is out of the destination range, the vehicle is removed from objects to be determined, so that the determination process can be executed quickly.

The exemplary embodiments of the present invention have been detailed with reference to the drawings, however, the specific constitutional example is not limited to the embodiments, and modifications in design, which fall within the spirit of the present invention, are intended to be embraced herein.

For example, in the embodiments, registration information about a vehicle is obtained by character recognition on the license plate of the vehicle, such as an automobile running on a road. The present invention is not, however, limited to this, and may be applied to mobile objects other than automobiles, such as a train, with identification number marked on a train body.

Also in the embodiments, the recognizing devices 12a to 12c installed by a road execute the character recognizing process on images of a license plate photographed by the image pickup devices 10a to 10c. The present invention is not, however, limited to this, and the images photographed by the image pickup devices 10a to 10c may be transmitted to a server device that executes the character recognition process. The server device may execute the character recognizing process.

All or some of the processes to be automatically executed in the embodiments can be executed manually, or all or some of the processes to be executed manually can be executed automatically by a known method. Further, the processing procedure, the control procedure, the specific names, and the information including various data and parameters shown in the data and the drawings can be arbitrarily changed except in particular cases.

The components of the devices shown in the drawings are functional, and thus may not always be physically constituted as shown in the drawings. The specific modes of dispersion and integration for the devices is not limited to those shown in the drawing, and all or some of them can be functionally or physically dispersed or integrated into arbitrary units based on various loads and use. All or some of the functions to be executed by the devices are realized by a CPU and programs to be analyzed and executed by the CPU, or realized as a hardware using wired logic.

According to the present invention, even if the character recognition is not accurate enough, a user can acquire information about the mobile object efficiently.

Moreover, a highly accurate result of the character recognition process is registered so that a user can acquire accurate information about the mobile object.

Furthermore, the destination range of the mobile object can be acquired efficiently.

Moreover, the determining process can be executed quickly.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable storage medium storing a computer program that makes a computer execute:
obtaining a first image by photographing identification information of a mobile object;

executing a character recognition process on the first image to obtain a plurality of candidates of a first character recognition result;

determining recognition accuracy of all of the candidates;

registering, all of the candidates, when the recognition accuracy of all of the candidates is lower than a predetermined level;

displaying all of the candidates registered simultaneously on a display unit;

obtaining a second image by photographing identification information of a second mobile object;

executing a character recognition process on the second image to obtain a second character recognition result whose recognition accuracy is higher than the predetermined level;

comparing each of the registered candidates with the second character recognition result to determine a matching candidate that matches the second character recognition result; and switching a display on the display unit from all of the displayed candidates to the matching candidate.

2. The non-transitory computer-readable storage medium according to claim 1, wherein the registering includes registering a candidate as the first character recognition result, when the recognition accuracy of the candidate is higher than the predetermined level.

3. The computer-readable storage medium according to claim 1, wherein the computer program further makes the computer execute:

predicting a destination range of the first mobile object within a predetermined time, when the candidates are registered.

4. The non-transitory computer-readable storage medium according to claim 3, wherein the comparing includes determining whether a position of the second mobile object is within the destination range predicted, and if the position of the second mobile object is within the destination range predicted, the comparing determines the matching candidate.

5. A mobile object information management device comprising:

a photographing unit that obtains a first image by photographing identification information of a first mobile object and, after obtaining the first image, obtains a second image by photographing identification information of a second mobile object;

a character recognizing unit that executes character recognition processing on the first image to obtain a plurality of candidates of a first character recognition result and executes character recognition processing on the second image to obtain a second character recognition result whose recognition accuracy is higher than a predetermined level;

an accuracy determining unit that determines recognition accuracy of all of the candidates;

a recognition result registering unit that registers all of the candidates, when the recognition accuracy of all of the candidates is lower than the predetermined level;

a character recognition result output unit that simultaneously displays all of the candidates registered; and a match determining unit that compares each of the registered candidates with the second character recognition result to determine a matching candidate that matches the second character recognition result, wherein the character recognition result output unit switches a display from all of the displayed candidates to the matching candidate.

6. The device according to claim 5, wherein the recognition result registering unit registers a candidate as the first character recognition result, when the recognition accuracy of the candidate is higher than the predetermined level.

7. The device according to claim 5, further comprising:

a destination range predicting unit that predicts a destination range of the first mobile object within predetermined time, when the candidates are registered.

8. The device according to claim 7, wherein the match determining unit determines whether a position of the second mobile object is within the destination range predicted, and if the position of the second mobile object is within the destination range predicted, the match determining unit determines the matching candidate.

9. A mobile object information management method comprising:

obtaining a first image by photographing identification information of a first mobile object;

executing a character recognition process on the first image to obtain a plurality of candidates of a first character recognition result;

determining recognition accuracy of all of the candidates;

registering all of the candidates, when the recognition accuracy of all of the candidates is lower than a predetermined level;

displaying all of the candidates registered simultaneously on a display unit;

obtaining a second image by photographing identification information of a second mobile object;

executing a character recognition process on the second image to obtain a second character recognition result whose recognition accuracy is higher than the predetermined level;

comparing each of the registered candidates with the second character recognition result to determine a matching candidate that matches the second character recognition result; and switching a display on the display unit from all of the displayed candidates to the matching candidate.

10. The method according to claim 9, wherein the registering includes registering a candidate as the first character recognition result, when the recognition accuracy of the candidate is higher than the predetermined level.

11. The method according to claim 9, further comprising:

predicting a destination range of the first mobile object within a predetermined time, when the candidates are registered.

12. The method according to claim 11, wherein the comparing includes determining whether a position of the second mobile object is within the destination range predicted, and if the position of the second mobile object is within the destination range predicted, the comparing determines the matching candidate.

13. A mobile object information management system comprising:

a photographing unit that obtains a first image by photographing identification information of a first mobile object and, after obtaining the first image, obtains a second image by photographing identification information of a second mobile object;

a character recognizing unit that executes character recognition processing on the first image to obtain a plurality of candidates of a first character recognition result and executes character recognition processing on the second image to obtain a second character recognition result whose recognition accuracy is higher than a predetermined level;
an accuracy determining unit that determines recognition accuracy of all of the candidates;
a recognition result registering unit that registers the candidates, when the recognition accuracy of all of the candidates is equal to or lower than the predetermined level;
a character recognition result output unit that simultaneously displays all of the candidates registered; and
a match determining unit that compares each of the registered candidates with the second character recognition result to determine a matching candidate that matches the second character recognition result,
wherein the character recognition result output unit switches a display from all of the displayed candidates to the matching candidate.

14. A mobile object information management method comprising:
- obtaining a first image of a first mobile object;
- recognizing characters on the first image to obtain a plurality of candidates of a first character recognition result;
- displaying all of the candidates on a display unit;
- obtaining a second image of a second mobile object;
- recognizing characters on the second image to obtain a second character recognition result whose recognition accuracy is higher than a predetermined level;
- comparing each of the registered candidates with the second character recognition result to determine a matching candidate that matches the second character recognition result; and
- switching a display on the display unit from all of the displayed candidates to the matching candidate.

* * * * *

UNITED STATES PATENT AND TRADEMARK OFFICE
CERTIFICATE OF CORRECTION

PATENT NO. : 7,778,447 B2  Page 1 of 1
APPLICATION NO. : 10/847476
DATED : August 17, 2010
INVENTOR(S) : Kunikazu Takahashi et al.

It is certified that error appears in the above-identified patent and that said Letters Patent is hereby corrected as shown below:

Column 13, Line 28, in Claim 3, after "The" insert --non-transitory--.

Signed and Sealed this
Fourth Day of January, 2011

David J. Kappos
*Director of the United States Patent and Trademark Office*